May 5, 1936.    A. S. HOWELL    2,039,906
STRIP FEED MECHANISM
Filed April 11, 1934    3 Sheets-Sheet 1
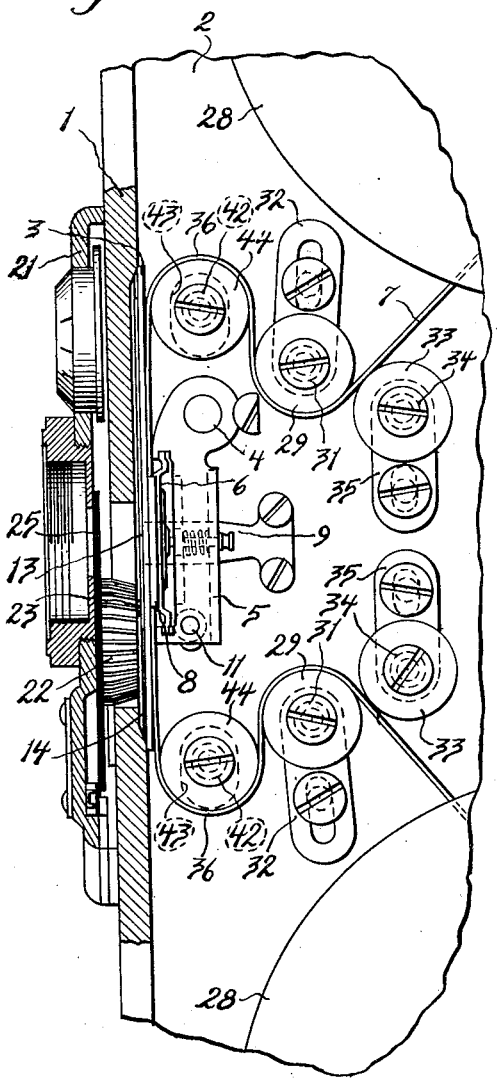
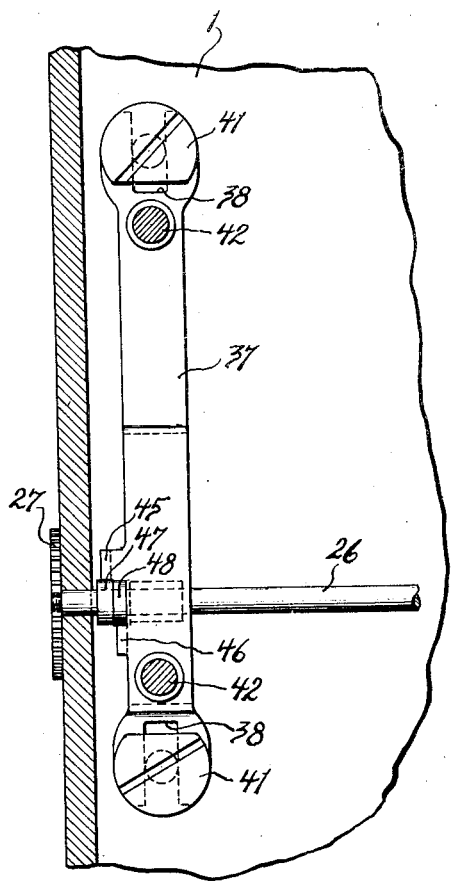
Inventor:
Albert S. Howell.

May 5, 1936.  A. S. HOWELL  2,039,906
STRIP FEED MECHANISM
Filed April 11, 1934     3 Sheets-Sheet 2
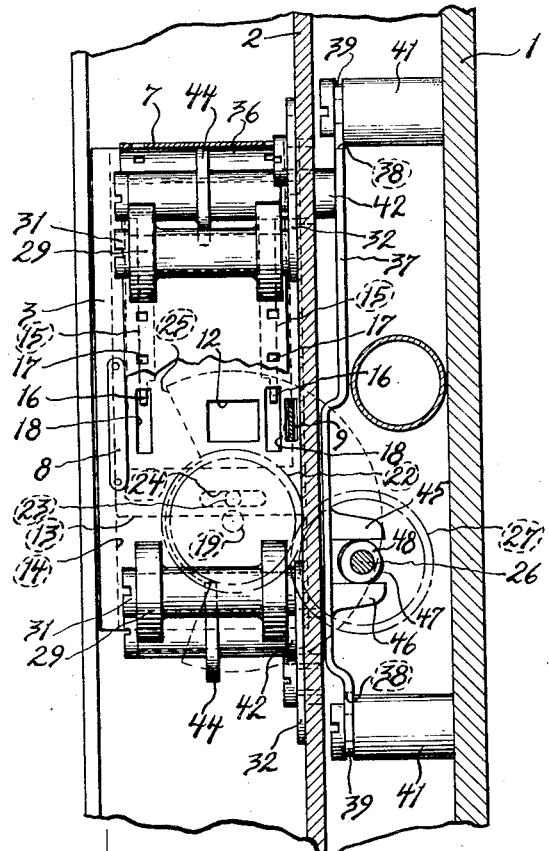
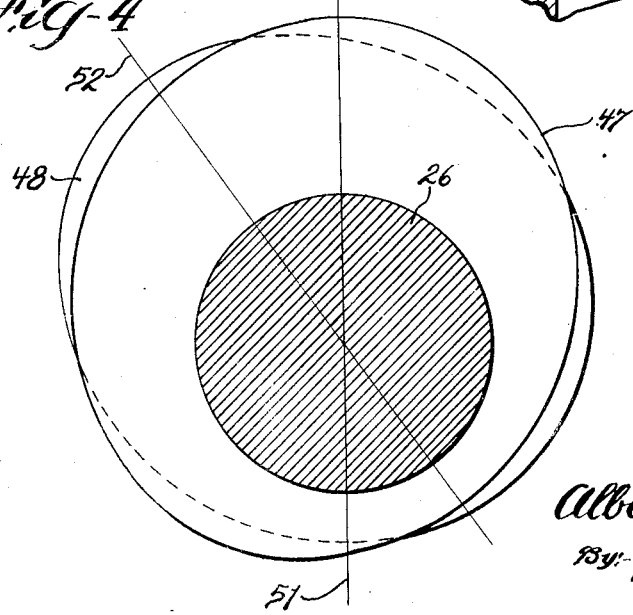
Inventor:
Albert S. Howell,
By Robert F. Miehle Jr.
Atty.

May 5, 1936.  A. S. HOWELL  2,039,906
STRIP FEED MECHANISM
Filed April 11, 1934  3 Sheets-Sheet 3
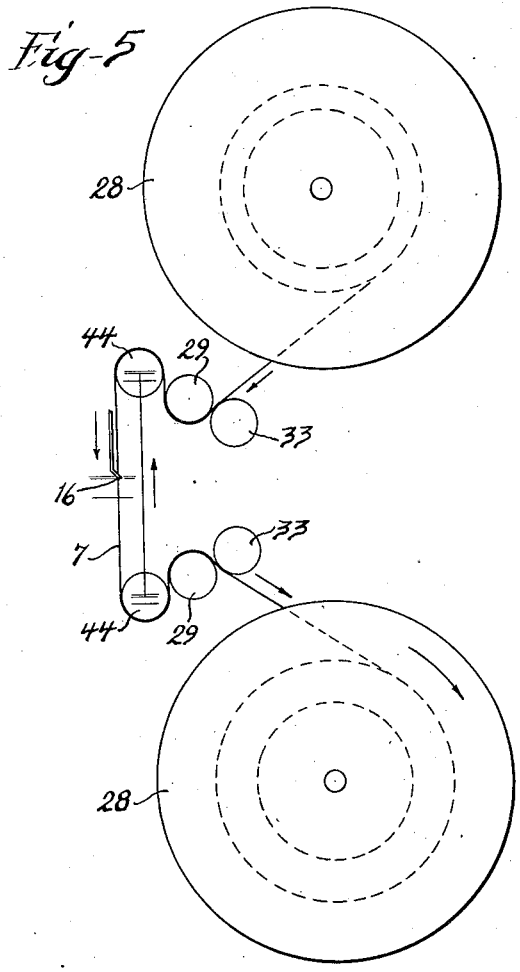
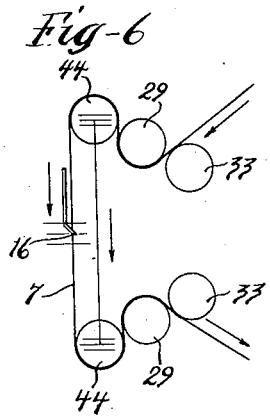
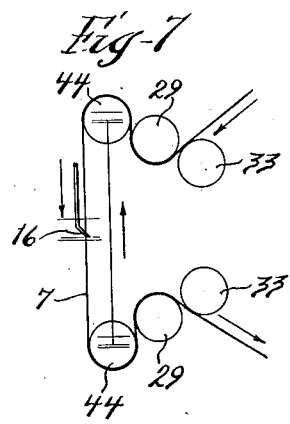
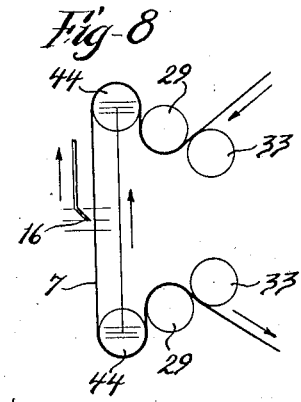
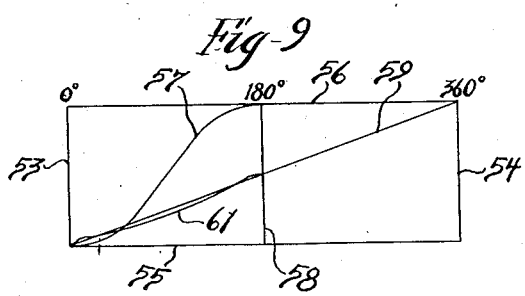
Inventor:
Albert S. Howell
By Robert F. Miller
Atty.

UNITED STATES PATENT OFFICE 2,039,906

STRIP FEED MECHANISM

Albert S. Howell, Chicago, Ill., assignor to The Bell & Howell Company, Chicago, Ill., a corporation of Illinois Application April 11, 1934, Serial No. 720,098

8 Claims. (Cl. 88—18.4)

My invention relates particularly to motion picture film strip feed mechanism although not limited to this use alone.

In motion picture film feed mechanism involving an intermittent feed of the film it is customary to employ a constant film feed means usually a revoluble sprocket means, for feeding the film to and from the intermittent feed station of the film, compensating loops in the film being maintained between the intermittent feed station and the constant film feed means to compensate between the intermittent and constant feed of the film.

It is the primary object of my invention to provide a novel and effective strip feed mechanism wherein, though the constant strip feed means is eliminated, compensation is at least partially, and preferably substantially, provided between the intermittent feed of the film and a uniform constant feed of the strip.

With this object in view my invention consists in certain features of novelty in the construction, combination and arrangement of parts by which the said object and certain other objects, hereinafter appearing, are effected, all as fully described with reference to the accompanying drawings and more particularly pointed out in the appended claims.

In the said drawings—

Figure 1 is a partial side elevation of a motion picture camera embodying my invention with parts removed and shown in section;

Figure 2 is a partial sectional view taken oppositely with respect to Figure 1;

Figure 3 is a partial sectional view of the camera taken on a transverse vertical plane and looking forwardly;

Figure 4 is a sectional view of the cam shaft showing the cams thereon, hereinafter described, in front elevation;

Figures 5, 6, 7 and 8 are partial diagrammatic views of the film engaging parts of the mechanism and showing them in the different positions thereof in their cycle of operation; and Figure 9 is diagrammatic illustration showing the film feeding action of the mechanism.

Referring to Figures 1, 2 and 3, a casing 1 encloses the mechanism, and a vertical frame plate 2 divides the enclosure of the casing to form a mechanism chamber and a film chamber adjacent the open side of the casing which open side is normally closed by a detachable cover, not shown.

A vertically disposed intermittent film feed guide is associated with the intermediate portion of the front wall of the casing in the plane of the aforesaid film chamber and consists as follows: A vertically elongated plate 3 is secured against the rear face of the front wall of the casing and constitutes the front face guide wall of the guide. Carried for pivotal movement at its upper end on a transverse axis, by means of a suitable mounting 4 carried by the frame plate 2, is a guide block 5 on which is mounted, for limited forward movement, a rear face guide plate 6 which is spring pressed forwardly with respect to the guide block 5, in a manner unnecessary to be described, to engage a film 7 in the guide between it and the front guide plate 3, the film being guided edgewise by a guide rail 8 at one edge of the film and a spring edge guide member 9 spring pressed against the other edge of the film. The guide block 5 is pivoted on the mounting 4 for rearward movement for lacing the film in the guide and is secured in its forward film guiding position by a releasable locking device generally designated at 11 in Figure 1.

The front face guide plate 3 is provided with an intermediate exposure aperture 12 through which the film is exposed in the guide, and the film is intermittently fed in the guide for the progressive exposure thereof by means of an intermittent feed mechanism now to be described.

An intermittent film feed shuttle plate 13 of elongated rectangular form is disposed longitudinally of and in parallelism with the front face guide plate 3 and immediately in front of the same and is engaged for vertical reciprocating movement longitudinally of the guide in a slide 14 formed in the rear face of the front wall of the casing.

The shuttle plate 13 has a pair of parallel resilient arms 15 struck up from intermediate metal of the plate and connected to one marginal end of the plate and extending longitudinally of the movement thereof toward the other end of the plate. See Figure 3. These arms are set to normally extend rearwardly out of the plane of the plate and the free ends thereof are formed, as designated at 16, for ratchet engagement with the usual longitudinally spaced marginal perforations 17 of the film 7 in the guide to move the film downwardly in the guide with the down stroke of the shuttle plate and to slide over the film on the up stroke of the shuttle plate for engagement with other perforations of the film for intermittently feeding the film in the guide with reciprocation of the shuttle plate, the frictional engagement of the film in the guide maintaining the registration of the film during its rest periods.

The arms 15 engage the film in the guide through longitudinal slots 18 in the guide plate 3 at the sides of the exposure aperture 12, and the intermediate metal of the shuttle plate is removed to provide an intermediate opening exposing the exposure aperture 12 of the front face guide plate.

A stud 19 is secured on the front wall of a shallow housing member 21, which is secured on the front face of the front wall of the casing 1, and extends rearwardly within the enclosure of this housing member, and a spur gear 22 is rotatably mounted on the stud 19 in the enclosure of the housing member. The gear 22 is provided with a rearwardly projecting crank stud 23 which engages a transverse slot 24 in the lower marginal end portion of the shuttle plate 3 for reciprocation of the shuttle plate with rotation of this gear to intermittently feed a film in the guide.

A segmental light shutter 25 is disposed in the enclosure of the housing member 21 and is secured on the gear 22 at the front thereof for intermittently covering the exposure aperture 12 or while the film is being intermittently moved in the guide.

A forwardly and rearwardly extending shaft 26 is mounted for rotation within the casing 1 at the inside of the frame plate 2 and has its forward end extending through and journaled in a bore through the front wall of the casing. See Figures 2 and 3. A spur gear 27, disposed within the enclosure of the housing member 21, is secured on the front end of the shaft 26 and meshes with the gear 22 for actuation of the intermittent film feeding mechanism with rotation of the shaft 26, the gears 22 and 27 having the same pitch diameter so that the shaft 26 and gear 22 rotate in one to one timed relation.

The mechanism above described is similar to that described and claimed in U. S. Letters Patent No. 1,767,848, issued June 24, 1930, upon application filed by me, for improvement in Motion picture camera and the like, and requires no further description herein.

As is usual, the film 7 is fed to and from rolls thereof on film reels 28 rotatably mounted in a usual manner within the film chamber of the camera, as shown, the film being drawn from the upper film reel and taken up by the lower film reel which is frictionally driven for this purpose from the mechanism of the camera as is usual.

In order to at least partially compensate, and, as shown, to substantially compensate, between the intermittent feed of the film in the exposure guide and a uniform constant feed of the film, say at the film reels, I provide the following.

Two vertically spaced rollers 29 are revolubly mounted on transverse axes, as designated at 31, upon brackets 32 secured on the outside of the frame plate 2, these rollers being spaced a short distance rearwardly of the plane of the film 7 in the intermittent film feed guide. Two additional vertically spaced rollers 33 are revolubly mounted on transverse axes, as designated at 34, upon brackets 35 secured on the outside of the frame plate 2, these rollers being arranged immediately to the rear of the rollers 29 and each immediately adjacent a roller 29.

The film 7 is laced, as shown in Figures 1 and 5, to extend from the film reels 28 between the adjacent rollers 29 and 33, and to form substantially semi-circular compensating loops 36, having the interiors thereof opposing each other, between the rollers 29 and the adjacent ends of the film guide, the rollers 29 confining the loops 36 and the rollers 33 maintaining the film properly engaged with the rollers 29.

Disposed on the inside of the frame plate 2 is a vertically extending carrier 37 which is mounted for vertical movement by means of the ends thereof being vertically slotted, as designated at 38, and engaged in grooves 39 of studs 41 which are mounted on the casing 1. See Figures 2 and 3.

Two vertically spaced studs 42 are secured on the carrier member 37 and extend transversely therefrom through vertically elongated openings 43 in the frame plate 2 and into the film chamber, and rollers 44 are rotatably mounted on the studs 42 in the film chamber for engagement with the opposing interiors of the compensating loops 36.

The carrier 37 and the rollers 44 are thus reciprocable in a path to alternately expand the loops 36, and the carrier and rollers 44 are reciprocated in one to one timed relation with the intermittent film feeding mechanism in the following manner.

Formed on the carrier 37 are two vertically spaced and transversely disposed projections 45 and 46 which are offset forwardly and rearwardly and of which the projection 45 is disposed above and the projection 46 is disposed below the shaft 26. Formed on the shaft 26 are two complemental cams 47 and 48 of which the cam 47 engages upwardly against the projection 45 for actuating the carrier 37 upwardly and of which the cam 48 engages downwardly against the projection 46 for actuating the carrier 37 downwardly, these cams functioning in complement to reciprocate the carrier with rotation of the shaft 26 in one to one timed relation with the intermittent film feeding mechanism.

The magnitude of the reciprocation of the carrier 37 and the rollers 44, effected by the cams 47 and 48, is in the order of one quarter of that of the intermittent film feed movement of the intermittent feeding mechanism and the timing of these cams with reference to the intermittent feeding mechanism is such that during the feed period of the intermittent feed mechanism these rollers substantially follow, but in a magnitude less than that of the intermittent film strip feed movement of the intermittent feeding means, the action of the intermittent feed movement of the film upon the loops 36, the opposite stroke of the rollers 44 occurring during the rest period of the intermittent feed of the film.

As a result the film is drawn from the upper or feed reel 28 and is permitted to be wound on the lower or take up reel 28 during both the intermittent feed period and the rest period of the intermittent feeding mechanism, the rollers 44 limiting the contraction of the loops 36 and expanding the same in timed relation with the intermittent film feeding mechanism.

Referring to the upper loop 36, during the film feeding period of the intermittent feed mechanism the upper roller 44 moves downwardly with the film in the guide but in a magnitude of approximately one quarter of that of the intermittent feed movement of the film which results in the film being drawn from the upper or feed reel 28. During the rest period of the intermittent feed mechanism, the upper roller 44 moves upwardly and expands the loop which results in film being drawn from the upper or feed reel 28, the amount of film drawn from the upper or feed reel 28 during a feed cycle of the intermittent feed mechanism being equal to an intermittent feed movement of the film in the guide.

Referring to the lower loop 36, the action of the lower roller 44 is the same upon the lower loop as that of the upper roller 44 on the upper loop, but the driving of the lower or take up reel 28, above referred to, serves to contract the lower film loop while the intermittent feed mechanism feeds the film to the lower loop.

In order that the feed movement of the film at the reels 28 shall be substantially constant and uniform, the cams 47 and 48 are constructed and timed in relation with the intermittent feed mechanism as follows:

Referring to Figure 4, the line 51, which extends through the axis of the cams 47 and 48, indicates the high point of the cam 47 and the corresponding diametrically opposite low point of the cam 48, and the line 52, which also extends through the axis of the cams 47 and 48, indicates the low point of the cam 47 and the corresponding diametrically opposite high point of the cam 48.

The lines 51 and 52 are angularly spaced, as shown 36°, so that one stroke of the carrier 37 occurs within less than 180° of the angular movement of the cams 47 and 48 whereas the opposite stroke of the carrier 37 occupies more than 180° of the angular movement of the cams 47 and 48.

The timing of the cams 47 and 48 with the intermittent feed mechanism is such that both reversals of the carrier 37 occur during the film feed stroke of the feed shuttle 13, both reversals of the carrier 37 thus occurring during the film feed period of the intermittent feed mechanism.

The intermittent feed of the film in the guide by the intermittent feed mechanism and the reciprocation of the rollers 44, with the carrier 37, cooperate in controlling the character of the film feed at the reels 28. That is to say, while the film is intermittently fed in the guide, the rollers 44 in their timed reciprocation with the intermittent feed mechanism and by reason of their control of the film loops 36 serve to effect the feed of the film at the reels 28, or on the sides of the film loops opposite those at which the intermittent feed station is disposed, during both the film feed and rest periods of the intermittent feed mechanism.

As both of the reversals of the carrier 37 occur during the film feed period of the intermittent feed mechanism, the feed of the film at the reels 28 is constant or continuous in that the shuttle 13 is feeding the film during the reversals of the carrier 37.

Referring to Figures 5, 6, 7 and 8, Figure 5 illustrates the feed condition at the initiation of the feed stroke of the shuttle 13. During this portion of the cycle, the shuttle 13 is engaged with the film in the guide and is feeding the film downwardly while the carrier 37 and rollers 44 are moving upwardly at the upper end of their upward stroke, the upward movement of the rollers 44 causing the movement of the film at the reels 28 to be in excess of the movement of the film in the guide.

As the shuttle 13 continues to move downwardly from the upper end of its stroke the velocity of the film in the guide increases toward the maximum velocity thereof at the medial portion of the downward stroke of the shuttle, and the reversal of the rollers 44 at the upper end of their stroke takes place at a point in the downward film feed stroke of the shuttle adjacent the upper end thereof where the velocity of the film in the guide is sufficiently great to effect the proper velocity of feed of the film at the reels.

After this point in the downward or film feed movement of the shuttle, the rollers 44 move downwardly and compensate for the increasing rate of feed of the film in the guide by their control of the loops 36, as indicated in Figure 6, so that the velocity of the film movement at the reels does not increase correspondingly.

As the shuttle approaches the lower end of its feed movement, the velocity of the feed of the film in the guide decreases and reaches a velocity which is that of the aforesaid proper velocity of the feed of the film at the reels, and at this point the rollers 44 are reversed, as indicated in Figure 7, after which the shuttle reaches the lower end of its feed movement and terminates the intermittent feed movement of the film in the guide, the upward movement of the rollers 44 continuing the movement of the film at the reels 28.

During the upward or return stroke of the shuttle, during which the film in the guide is at rest, the rollers 44 are moving upwardly and are thus continuing the movement of the film at the reels 28, as indicated in Figure 8.

Thus, the movement of the film at the reels 28 occurs during both the intermittent feed and rest periods of the film in the guide and is continuous by reason of the timing of the reversals of the rollers 44 with the intermittent feed mechanism so that both reversals of the rollers 44 take place during the intermittent feed of the film.

As shown, the movement of the film at the reels is not only continuous, but, due to the timing of the reversals of the rollers 44 with the intermittent feeding mechanism and the formation of the cams 47 and 48, is substantially uniform, as is illustrated in Figure 9.

Referring to Figure 9, the space between the vertical lines 53 and 54 represents a cycle of the intermittent feed mechanism, and the space between the horizontal lines 55 and 56 represents the extent of an intermittent feed movement of the film in the guide. The line 57 represents an intermittent feed movement of the film in the guide which varies in velocity as indicated, the intermittent feed period of the film in the guide being indicated as occurring between the line 53 and intermediate vertical line 58 and the rest period of the film in the guide being indicated as occurring between the lines 58 and 54.

A uniform constant feed movement of the film during a cycle of the intermittent feed mechanism and equal to the intermittent film feed movement of the intermittent feed mechanism is indicated by the diagonal line 59 which extends from the line 53 to the line 54.

The feed movement of the film at the reels 28 as effected by the rollers 44 in cooperation with the intermittent feed movement is indicated by the line 61 extending between the lines 53 and 58 and the portion of the line 59 being between the lines 58 and 54 which continues the line 61.

It will be observed that the line 61 is, due to practical considerations with reference to the intermittent feed movement as shown, a moderately sinuous one indicating a slight deviation from a uniform movement of the film at the reels 28 during the intermittent feed period of the film in the guide, but the deviation is so slight that for practical purposes the movement of the film at the reels is a substantially uniformly constant movement as is desired.

Having thus described my invention, I do not wish to be limited to the precise details described as changes may be readily made without departing from the spirit of my invention, but having thus described my invention, I claim as new and desire to secure by Letters Patent the following:

1. In a strip feed device the combination with means for intermittently feeding a strip, of a member engageable with the interior of a compensating loop in the fed strip and mounted for movement in a path to expand the same, and means driven with said feeding means for reciprocating said loop engaging member in said path in one to one timed relation with the feeding cycle of said feeding means and in a magnitude less than that of the intermittent strip feed movement of said feeding means and adapted to at least partially compensate between the intermittent feed of the strip on one side of said loop and a uniform constant feed of the strip on the other side of said loop.

2. In a strip feed device the combination with means for intermittently feeding a strip, of a member engageable with the interior of a substantially semi-circular compensating loop in the fed strip and mounted for movement in a path to expand the same, and means for reciprocating said loop engaging member in said path in one to one timed relation with the feeding cycle of said feeding means and in a magnitude in the order of one quarter of that of the intermittent strip feed movement of said feeding means and adapted to effect both reversals of the reciprocating movement of said loop engaging member during the intermittent feed period of said feeding means and adapted to substantially compensate between the intermittent feed of the strip on one side of said loop and a uniform constant feed of the strip on the other side of said loop.

3. In a strip feed device the combination with a strip feed guide and means for intermittently feeding a strip in the guide, of a device engageable with the opposing interiors of compensating loops in the fed strip at opposite ends of said guide and mounted for reciprocation in a path to alternately expand said loops, and means for reciprocating said loop engaging device in said path in one to one timed relation with said feeding means and adapted to at least partially compensate between the intermittent feed of the strip in said guide and a uniform constant feed of the strip on the sides of said loops opposite those on which said guide is disposed.

4. In a strip feed device the combination with a strip feed guide and means for intermittently feeding a strip in the guide, of a device engageable with the opposing interiors of substantially semi-circular compensating loops in the fed strip at opposite ends of said guide and mounted for reciprocation longitudinally of said guide to alternately expand said loops, and means for reciprocating said loop engaging device in said path in one to one timed relation with said feeding means and in a magnitude in the order of one quarter of that of the intermittent strip feed movement of said feeding means and adapted to effect both reversals of the reciprocating movement of said loop engaging member during the intermittent feed period of said feeding means and adapted to substantially compensate between the intermittent feed of the strip in said guide and a uniform constant feed of the strip on the sides of said loops opposite those on which said guide is disposed.

5. In a motion picture machine the combination with a film strip feed guide, means for intermittently feeding a perforated film strip in said guide and means for carrying a roll of the fed film strip and permitting rotation of said roll, of means affording a compensating loop in the film strip between said roll and an end of said guide, a member engageable with the interior of said loop and mounted for movement in a path to expand the same, and means driven with said feeding means for reciprocating said loop engaging member in said path in one to one timed relation with the feeding cycle of said feeding means and in a magnitude less than that of the intermittent film strip feed movement of said feeding means and adapted to at least partially compensate between the intermittent feed of the film strip in said guide and a uniform constant feed of the strip on the other side of said loop.

6. In a motion picture machine the combination with a film strip guide, means for intermittently feeding a perforated film strip in said guide and means for carrying a roll of the fed film strip and permitting rotation of said roll, of means affording a substantially semi-circular compensating loop in the film strip between said roll and an end of the guide, a member engageable with the interior of said loop and mounted for movement in a path to expand the same, and means driven with said feeding means for reciprocating said loop engaging member in said path in one to one timed relation with the feeding cycle of said feeding means and in a magnitude in the order of one quarter of that of the intermittent strip feed movement of said feeding means and adapted to effect both reversals of the reciprocating movement of said loop engaging member during the intermittent feed period of said feeding means and adapted to substantially compensate between the intermittent feed of the strip in said guide and a uniform constant feed of the strip on the other side of said strip.

7. In a motion picture machine the combination with a film strip guide, means for intermittently feeding a perforated film strip in said guide and means for carrying rolls of the fed film strip beyond opposite ends of said guide and permitting rotation of said rolls, of means affording compensating loops in the fed strip at opposite ends of said guide, said loops having the interiors thereof opposing each other, a device engageable with the opposing interiors of said loops and mounted for reciprocation in a path to alternately expand the same, and means for reciprocating said loop engaging device in said path in timed relation with said feeding means and adapted to at least partially compensate between the intermittent feed of the strip in said guide and a uniform constant feed of the strip on the sides of said loops opposite those on which said guide is disposed.

8. In a motion picture machine the combination with a film strip guide, means for intermittently feeding a perforated film strip in said guide and means for carrying rolls of the fed film strip beyond opposite ends of said guide and permitting rotation of said rolls, of means affording substantially semi-circular compensating loops in the fed strip at opposite ends of said guide, said loops having the interiors thereof opposing each other, a device engageable with the opposing interiors of said loops and mounted for reciprocation in a path to alternately expand the same, and means for reciprocating said loop engaging device in said path in one to one timed relation with said feeding means and in a magnitude in the order of one quarter of that of the intermittent strip feed movement of said feeding means and adapted to effect both reversals of the reciprocating movement of said loop engaging member during the intermittent feed period of said feeding means and adapted to substantially compensate between the intermittent feed of the strip in said guide and a uniform constant feed of the strip on the sides of said loops opposite those on which said guide is disposed.

ALBERT S. HOWELL.